April 11, 1933.     M. E. A. BAULE     1,903,713
DYNAMOMETRIC LOG
Filed March 14, 1930     2 Sheets-Sheet 1
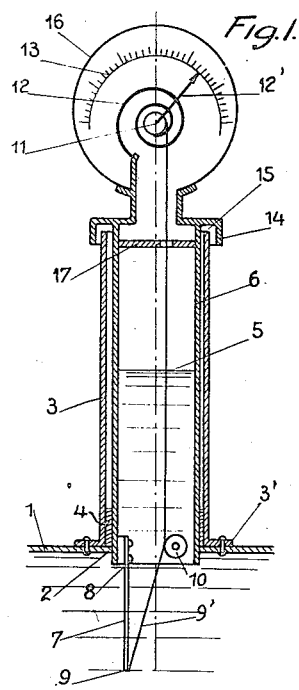
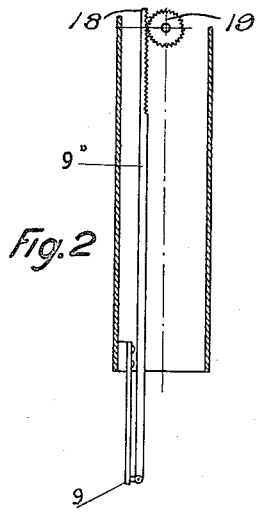
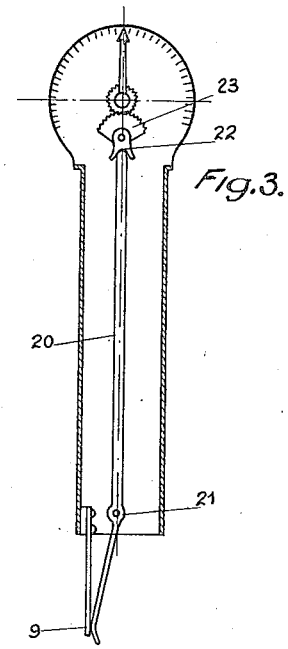
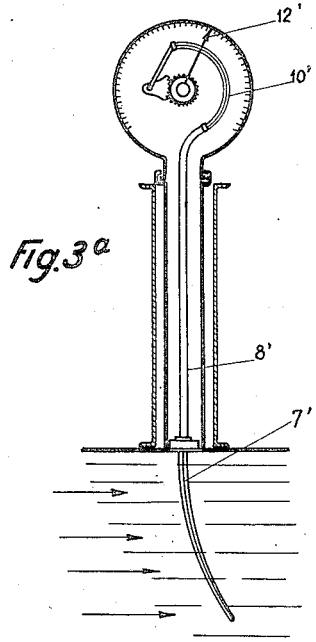
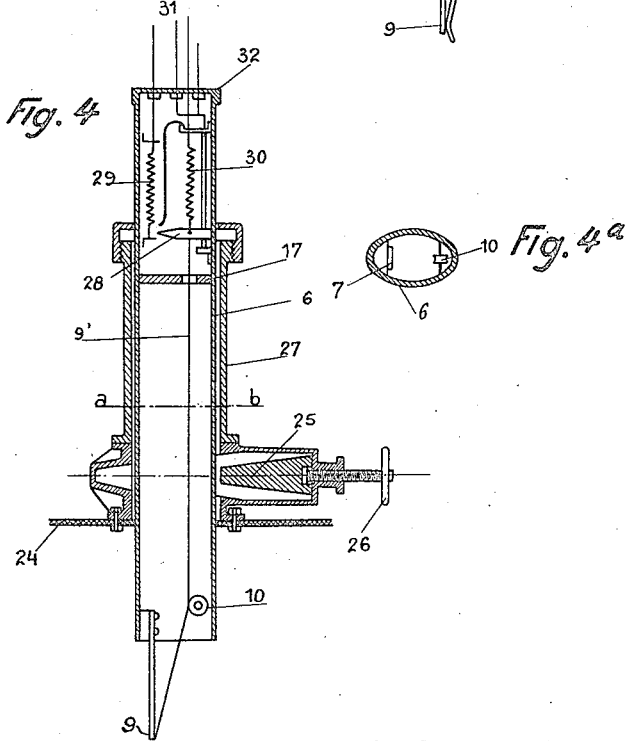
M. E. A. Baule
INVENTOR
By: Marks & Clerk
ATTYS.

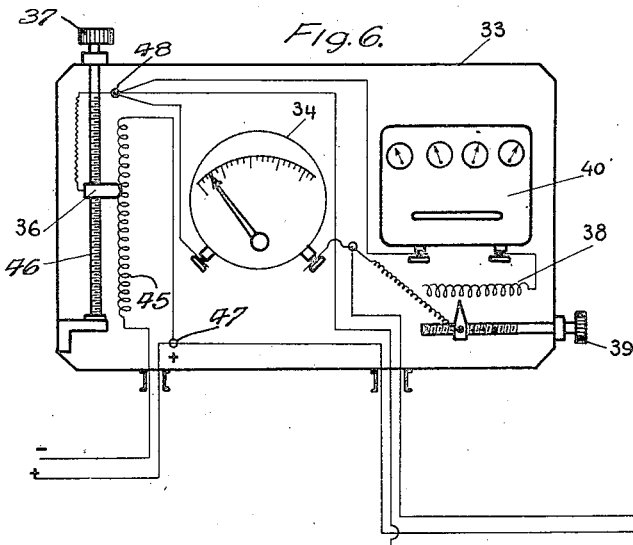
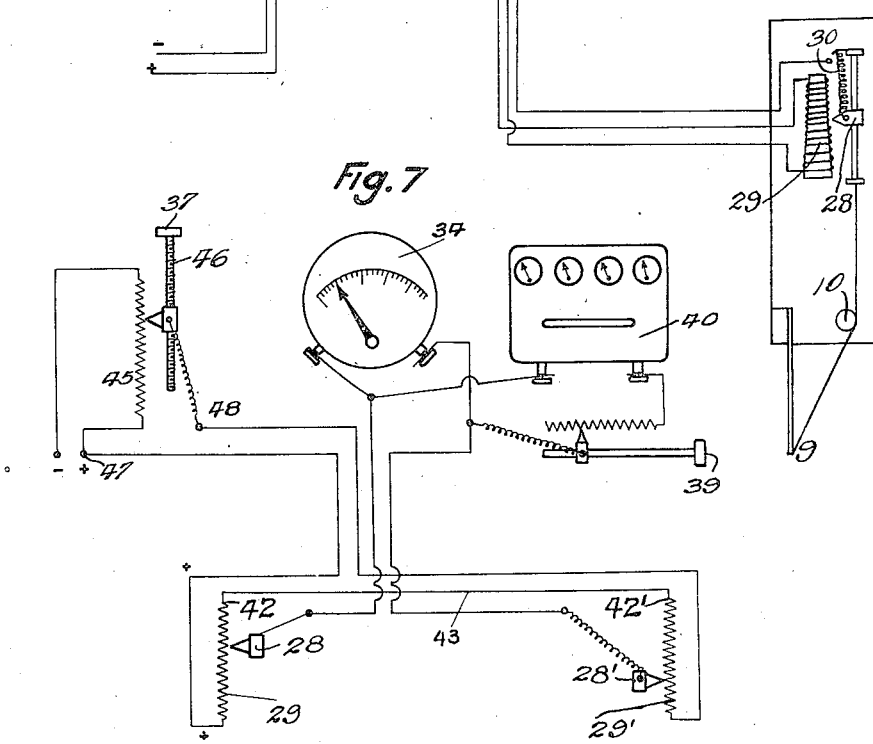
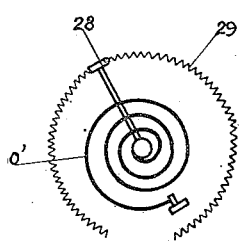

Patented Apr. 11, 1933

1,903,713

UNITED STATES PATENT OFFICE

MARIE EMILE ALFRED BAULE, OF CHAVILLE, FRANCE

DYNAMOMETRIC LOG

Application filed March 14, 1930, Serial No. 435,935, and in France March 16, 1929.

Few of the numerous known logs or like devices proposed for measuring the speed of fluid currents fulfil the conditions required for a practical measuring instrument either in the case of the measure of the output of a stream, a pipe under pressure, a steam pipe and the like or in the case of the measure of the relative speed of a vehicle such as a ship or an aircraft with reference to the fluid wherein it moves.

The devices working under the action of the continuous rotation of a propeller or a turbine under the action of the fluid current require if they are to be correct and sensitive a very accurate mounting and a difficult maintenance of the pivots or axes of rotation. The friction varies with the wear and with the amount of lubrication whereby the scale is rendered variable and it is necessary to correct the reading given out by the apparatus and to frequently adjust them.

Logs or like devices working according to Pitot's hydrodynamic phenomenon are also difficult to use and can only be used in laboratories where skilled handicraft is available.

The apparatus according to my invention shows the following advantages over the known apparatuses.

(a) It is extremely simple, which ensures strength and an easy handling;

(b) It comprises no part rotating continuously;

(c) It may be built for measuring a wide range of speeds with any fluid;

(d) Its sensitivity may be made as great as possible for measuring small speeds;

(e) Its inner arrangement allows very easily the measures made whether instantaneous speed, hourly output or distance traveled to be given out at a distance;

(f) It requires for mounting on ships the provision of only very small apertures in the hull;

(g) It cannot retain grass or solid particles suspended in the water and opposes only a negligible resistance to the ship's progress.

These advantages are due to the very principle of the invention, to wit the measure of the deformation of a yielding part produced by a fluid in relative movement with reference thereto.

This part may be for instance an elastic blade or rod disposed across the fluid stream and the deformation of which, depending on the relative speed of the fluid, is transmitted mechanically, electrically or through a manometric method to an indicating hand or an integrator giving out the output of a river or a pipe or the distance traveled by a vehicle.

I give the blade or rod preferably a decreasing width from the end through which it is held to its free end.

This has the advantage of giving a great sensitivity to the apparatus which may thus measure as well very small and very high speeds. This is due to the fact that for small speeds only the free end will be deformed, due to its small cross-section whereas, the speed increasing, the larger cross-section will be progressively deformed without the sensitive part having a smaller cross-section being damaged through excessive deformation as, at this moment, this part will be directed streamdownwards and opposes no further resistance.

In view of an indication and an integration at a distance, the deformation of the blade may either move the controlling part of any known distant control device (impulse-receiving controlled motor, synchronous motor, Wheatstone bridge order transmission etc.) or else act by way of example in the following manner.

The deformation of the blade is transmitted mechanically to the slide of an electric resistance mounted as a potentiometer; the difference in voltage P between the slide and a pole of the supply supposed to be at constant voltage depends at each moment on the deformation of the blade and therefore on the speed V of the fluid. Thus the speed may therefore be indicated at a distance by the measure of the difference of voltage through any voltmetric apparatus; on the other hand the output of the fluid or the distance traveled in the case of a vehicle are proportional for each elementary duration $dt$ to the product $Vdt$ and the total of these elementary outputs for a duration $t$ is $$D = \int_0^t V dt$$

Now if the difference of voltage P passes through a constant resistance R, the intensity I absorbed by this current is such that $P = RI$. Consequently if the apparatuses are adjusted in such a way that P is proportional to $v$ (or $KP = v$), we shall have $$D = \int_0^t KP dt = KR \int_0^t I dt$$

The integral $$\int_0^t I dt$$

is easily obtained through the agency of an intensity meter inserted in the circuit of the resistance.

I will describe hereinafter, by way of example, several forms of execution of my invention which has however a very wide scope and must be designed for each particular case in a different manner and according to the circumstances of the case.

Figs. 1, 2 and 3 are longitudinal cross-sections of a log arrangement of my improved dynamometric type comprising an immersed yielding blade transmitting no indication at a distance and adapted for the measure of the speed of small ships and crafts.

Fig. 3a is the longitudinal section of a log with a manometric transmission.

Figure 4 is a longitudinal cross-section illustrating a device for the electric transmission of indication of the speed.

Figure 4a is a cross-section of the same.

Figures 5, 6, 7 are diagrams of electrical devices indicating the speed and integrating the same.

In the form of execution shown in Figs. 1, 2 and 3 the hull 1 of the small ship or craft is provided with an aperture 2 over which is disposed a tubular well 3 with stuffing box 4 at its foot 3'; the upper end of the well opens substantially above the level 5 of the water line and the water enters the well up to the level 5.

Inside the well a tube 6 of elliptical cross-section is adapted to rise and fall so that said tube can be taken out in order to allow the yielding blade to be visited or repaired; said tube carries at its lower end a yielding blade 7 held securely at 8 and the free end of which bears a part allowing to transmit mechanically to an indicator hand the movement produced by the deformation of the blade.

For instance I may secure on to the blade end 9 a wire or thread 9' passing first round a pulley 10 and then on to a drum 11 at the upper end of the tube 6.

This drum is rotatably secured to very free pivots and a spring, coiled or not is connected between a point of the drum or of its axis and a stationary part so as to hold the wire or thread constantly taut, without its tension being sufficient for causing any deformation of the blade prior to use.

An indicator hand 12' is integral with the drum and moves in front of a dial 13 graduated in miles per hour.

A flange 14 integral with the tube 6 covers the upper edge of the well and has its periphery folded over same whereby it is adapted to ensure watertightness with the interposition of the packing 15. The indicating means may be contained in a casing 16 the upper end of which is water-tight so as to prevent any water projections in case of a sudden modification in the trim of the ship.

I may also provide a watertight or semi-watertight partition 17 through which the transmission means are adapted to pass.

The transmission means may be of a different kind, for instance (Fig. 2) they may comprise a rigid rod 9'' pivotally secured at 9 with the blade and the top of which forms a rack 18 meshing with a pinion 19 replacing the drum shown in Fig. 1.

I may also use within the scope of my invention a very slightly yielding blade the deformations of which are transmitted and amplified by means of a lever 20 pivoted at 21; the small arm of this lever is connected at 9 with the blade and the long arm controls at 22 a suitable amplifying device 23 which gives the hand movements having a sufficient elongation.

I may again transmit the deformation of the blade or like yielding part to the indicating hand through a manometric device (Fig. 3a). In this case the yielding part is formed by a tube 7' having an elliptical cross-section similar to a manometric tube. This tube is closed at its free end, the other end being connected through a pipe 8' with a receiver 10' of any suitable type, whose needle is actuated by the changes of volume of a yielding casing such as a barometer casing or a tube of a metallic manometer. The inside of the tube, pipe and receiver is filled with a non-compressible fluid; under the action of the elastic deformation to which the pipe 7' is submitted, the inner volume of the tube decreases. Consequently the volume of the receiver increases by a corresponding amount and the hand 12' of the receiver moves therefore according to the speed of the ship or of the current which deforms the tube. The receiver may be disposed at any suitable distance or else its needle may actuate distant repeater or integrating devices as disclosed hereinbelow.

Obviously the above described apparatus does not necessarily comprise any well or aperture in the hull, in case the tube 6 is held from outside the boat or craft by hand for momentary observations, or through a stationary or removable arm projecting outside the boat by the desired amount.

The following description relates to an improved type for large ships.

To the hull 24 (Fig. 4) is secured a sliding sluice-valve 25 controlled by the handwheel 26. Over said valve is disposed a well 27 where through may slide freely the blade carrying tube 6 similar to the tube 6 shown in Fig. 1.

In the case of large ships, it is of interest to preserve the blade from the eddies surrounding the hull by increasing the amount by which the tube projects beyond the hull, in such a case the cross-section of the tube 6 is as shown on Fig. 4a (which is a cross-section through the plane ab of Fig. 4) so as to diminish the resistance formed by said tube in the current.

The deformation of the blade is transmitted through any suitable mechanical transmissions such as those described hereinabove to the slide 28 of a rectilinear resistance 29 or a curvilinear resistance 29′ as shown on Fig 5. An antagonistic spring 30 or 30′ keeps the wire 9′ taut or compensates the lost motion in the transmission.

The resistance is submitted to a constant difference in voltage and the electric leads 31 connected with the terminals of the resistance or with the slide pass in a watertight manner through the insulating plug 32.

The electric arrangement is carried in an insulating medium such as air compressed into the closed space formed at the upper part of the apparatus.

The receiver of the apparatus comprises a casing 33 (Fig. 6) containing:

A potentiometer comprising a resistance 45 connected to the poles of an electric supply and a sliding contact 36 able to be displaced on it by means, say of a screw 46 actuated by the knob 37, said device allowing to adjust at will the potential difference between terminals 47 and 48. Said terminals are connected to the ends of the potentiometer 29 whose sliding contact is operated by the resilient blade. The resistance of said potentiometer may be constituted by a wire wound over a carrier shaped so as to obtain a distribution of potential according to a given law. For instance, it shall be advantageous to determine experimentally the shape of the carrier, in such a manner that the potential between the end connected with the terminal 47 and the sliding contact be proportional to the speed of the ship.

A voltmeter 34 is connected, on one hand to terminal 48, and on the other hand to the sliding contact 28; it is obvious that thus the indications of said voltmeter will be proportional to the instantaneous speed of the ship.

An integrating meter 40 is connected, on one hand, directly to terminal 48, and, on the other, to the sliding contact by intermediary of a resistance 38 adjustable by means of a sliding contact actuated by a knob 39. The integrating meter 40 is a counter operated by a shunt motor and is provided with totalizing dials graduated in miles or kilometers. It is obvious that the current in the integrating meter is thus proportional to the speed, therefore, as explained above, the indications of the meter 40 will be proportional to the distance travelled over by the ship; the rate between the indications of the meter and the current can be brought to a suitable value by actuating the knob 39. The potentiometer 36, 37, 46, 45 permits of adjusting the voltage in the circuit and the resistance 38 permits of calibrating the counter 40 in respect of conditions derivating from the kind of the ship, the movements of the water stream variable according to the design of the ship's hull, or the situation of the log.

Of course, I may give to the resistance 29 of the potentiometer a circular shape, as shown on Figure 5, the sliding contact taking then an angular displacement when the resilient blade is bent by the fluid pressure.

Sometimes, it seems better to provide logs on each side of a ship and to take the mean value of the indications given by each of them, this can be, in the present case, easily obtained with two tubes, one on the starboard and the other on portboard, the electric indicator is then disposed as shown on Figure 7.

The two potentiometers 29 and 29′, actuated by said logs having their resistances wound upon suitably shaped carriers, as explained above, are connected in series with the terminals 47 and 48.

The voltmeter 34 and the integrating meter 40 are connected both in parallel between the sliding contacts of said potentiometers.

42 being on the potentiometer 29 the initial position of sliding contact 28 and 42′ on the potentiometer 29′ the corresponding position of sliding contact 28′, if the difference of potential between 28 and 42 is proportional to the speed measured by the portboard tube, and the difference of potential between 28′ and 42′ to the speed measured by the starboard tube, it is obvious that the difference of potential between the two sliding contacts 28 and 28′ is proportional to the sum of both speeds, or to twice the mean value. Since, it is said difference of potential which actuates the voltmeter and the integrating meter, the indications of said instruments will be proportional to the mean value of said speeds.

What I claim is:

1. A device for measuring the instantaneous speed of a fluid with reference to the device, especially suitable for ship logs, comprising an indeformable tube whose cross-section is elliptically shaped having an end adapted to penetrate into the fluid, a resilient blade adapted to be bent by the fluid pressure, means to secure one end portion of said blade to the end of said tube which is adapted to penetrate into the fluid, a device for indicating the instantaneous speed; and means extending through said tube and connecting said device and said blade and adapted to transmit movements of the blade to the device.

2. A device for measuring the instantaneous speed of a fluid with reference to the device, especially suitable for ship logs, comprising an indeformable tube whose cross-section is elliptically shaped, said tube having an end adapted to penetrate into the fluid, a resilient blade adapted to be bent by the fluid pressure and whose width is decreasing from the secured end to the free one, means to secure one end of said blade to the end of said tube which is adapted to penetrate into the fluid, a device for indicating the instantaneous speed, and means extending through said tube and connecting said device and said blade and adapted to transmit movements of the blade to the device.

3. A device for measuring the instantaneous speed of a fluid with reference to the device, especially suitable for ship logs, comprising an indeformable tube, whose cross-section is elliptically shaped, said tube having an end adapted to penetrate into the fluid, a resilient blade adapted to be bent by the fluid pressure, means to secure one end of said blade to the end of said tube which is adapted to penetrate into the fluid, a dial, an index moving on said dial in order to indicate the instantaneous speed, and means extending through said tube and connecting said index and said blade and adapted to transmit movements of the blade to the index.

4. A device for measuring the instantaneous speed of a fluid with reference to the device, especially suitable for ship logs, comprising an indeformable tube, whose cross-section is elliptically shaped, said tube having an end adapted to penetrate into the fluid, a resilient hollow blade adapted to be bent by the fluid pressure, means to secure one end of said blade to the end of said tube which is adapted to penetrate into the fluid, a liquid inside said hollow blade, a device for indicating the instantaneous speed, and means extending through said tube and connecting said blade and adapted to transmit to the device the variations of pressure of said liquid produced by the bending of the blade.

5. A device for measuring the instantaneous speed of a fluid with reference to the device and for integrating said speed with reference to time, especially suitable for ship logs, comprising an indeformable tube, whose cross-section is elliptically shaped, said tube having an end adapted to penetrate into the fluid, a resilient blade adapted to be bent by the fluid pressure, means to secure one end of said blade to the end of said tube which is adapted to penetrate into the fluid, devices indicating the instantaneous speed and integrating the same, a resistance, a contact adapted to cooperate with said resistance, an electric supply, means to connect said supply, said resistance, said sliding contact and said devices in order to actuate said devices according to the contact position, and mechanical means connected to the free end of said blade and to said contact, extending into said tube and adapted to transmit movements of said blade to said contact.

6. A device for measuring the instantaneous speed of a fluid with reference to the device and for integrating said speed with reference to time, especially suitable for ship logs, comprising an indeformable tube, whose cross-section is elliptically shaped, said tube having an end adapted to penetrate into the fluid, a resilient blade adapted to be bent by the fluid pressure, means to secure one end of said blade to the end of said tube which is adapted to penetrate into the fluid, a voltmeter, an integrating meter, an electric supply, a potentiometer fed by said electric supply, said potentiometer having a sliding contact, means connected to the free end of the blade and extending inside the tube for transmitting to said contact the displacements of the free end of the blade, means to connect said voltmeter to the potentiometer in order to have indications with reference to the position of the sliding contact, and means to connect the integrating meter to said potentiometer in such a manner that the current flowing across said meter depends on the position of the sliding contact.

7. A device for measuring the instantaneous speed of a fluid with reference to the device and for integrating said speed with reference to time, especially suitable for ship logs, comprising an indeformable tube, whose cross-section is elliptically shaped, said tube having an end adapted to penetrate into the fluid, a resilient blade adapted to be bent by the fluid pressure, means to secure one end of said blade to the end of said tube which is adapted to penetrate into the fluid, a voltmeter, an integrating meter, an electric supply, a potentiometer fed by said electric supply, said potentiometer having a sliding contact, means connected to the free end of the blade and extending inside the tube for transmitting to said contact the displacements of the free end of the blade, means to connect said voltmeter to the potentiometer in order to have indications with reference to the position of the sliding contact, means to connect the integrating meter to said potentiometer in such a manner that the current flowing across said meter depends on the position of the sliding contact, the potentiometer being constituted by a wire wound on a frame shaped in such a way that the intensity of the current flowing across the integrating meter is proportional to the fluid speed with reference to the device.

8. A ship log constituted by a device according to claim 7, and an additional fluid pressure responsive element and potentiometer, one pressure responsive element being placed on starboard and the other on portboard of the ship, means to connect both potentiometers in series with the single voltmeter and the single integrating meter, and means to operate by said potentiometers said single voltmeter and said single integrating meter.

In testimony whereof I have affixed my signature.

MARIE EMILE ALFRED BAULE.